Patented July 5, 1927.

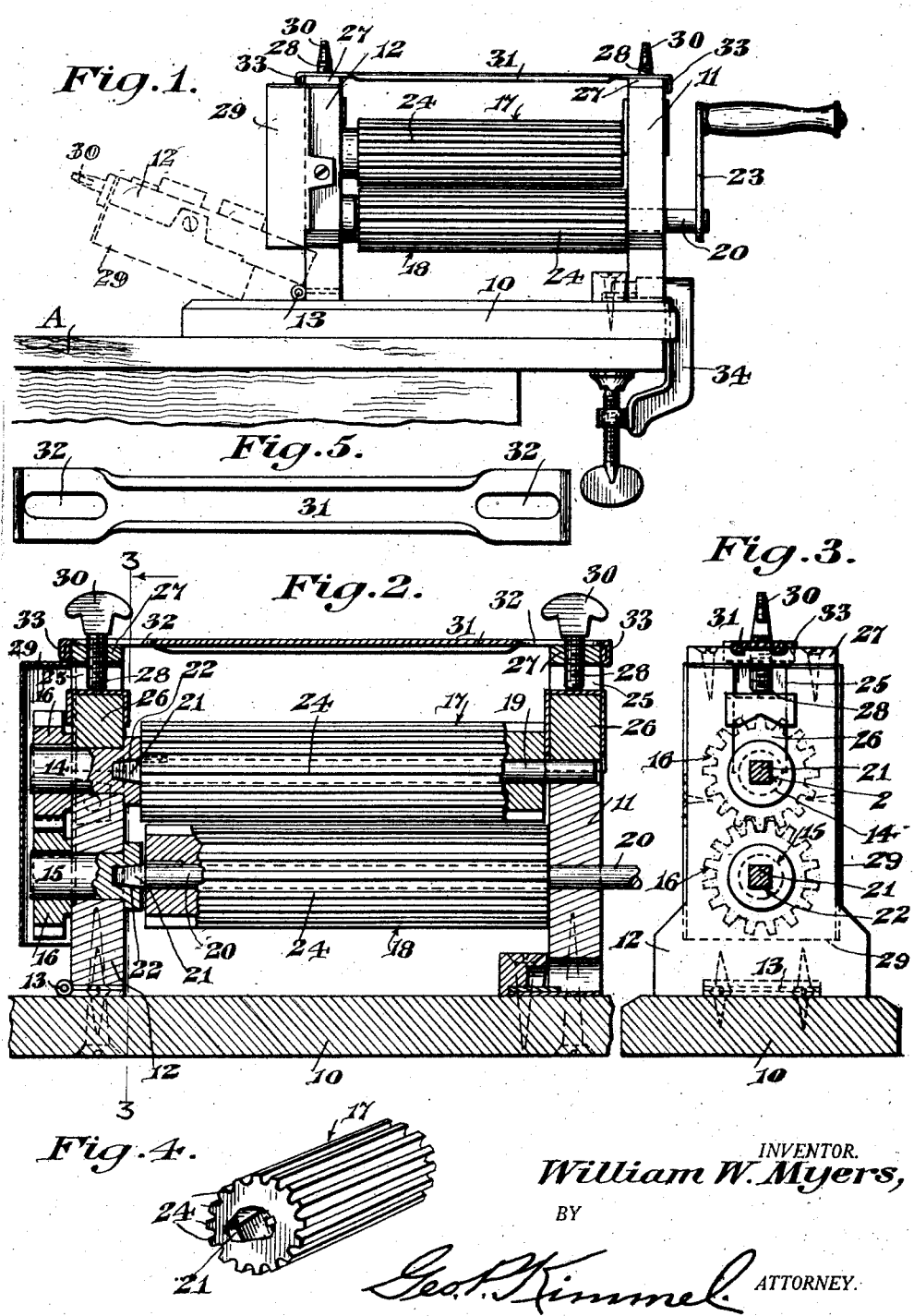

1,635,053

UNITED STATES PATENT OFFICE.

WILLIAM WALTER MYERS, OF STONY POINT, NORTH CAROLINA.

MEAT TENDERER.

Application filed March 14, 1927. Serial No. 175,278.

This invention relates to a meat tenderer, and has for its primary object the provision of a machine of this character, wherein a piece of meat when passed through the machine will have its sinews and body fibers broken, so as to render the meat tender after the cooking of the same, the machine being of novel form, so that after use, the presser rollers thereof can be readily and conveniently removed, to permit the thorough and easy cleaning thereof with dispatch, thus rendering the machine thoroughly sanitary.

Another object of the invention is the provision of a machine of this character, wherein the frame for the presser rolls or rollers involves a releasable standard for the journals of the rolls or rollers at one end thereof, so that said rolls or rollers can be quickly and easily removed for cleaning purposes, the machine being novel in form as to permit the required and proper adjustments of its rolls or rollers relative to each other for accommodating meat of varying thicknesses to be fed therebetween and resultant proper action of the rolls or rollers thereon for the tendering of the same.

A further object of the invention is the provision of a machine of this character, wherein the parts thereof are assembled in a novel and unique manner, so that the presser rolls or rollers will be exposed at the proper degree to permit the convenient feeding of meat therebetween for the tendering thereof, while the other moving parts are concealed, to eliminate possibility of injury to the operator in the use of the machine.

A still further object of the invention is the provision of a machine of this character, which is extremely simple in its construction, thoroughly reliable and efficient in its purpose, strong, durable, and inexpensive to manufacture and install.

With these and other objects in view, the invention consists in the features of construction, combination and arrangement of parts, as will be hereinafter more fully described, illustrated in the accompanying drawing showing the preferred embodiment of the invention, and pointed out in the claims hereunto appended. However, it is to be understood that changes, variations and modifications may be made in the structure, without departing from the spirit of the invention or sacrificing any of its advantages as fall within the scope of the claims hereunto appended.

In the accompanying drawing:—

Figure 1 is an elevation of the machine constructed in accordance with the invention clamped to a support, the adjustable standard or upright for the presser rolls or rollers being shown by full lines in supporting position and by dotted lines in releasing position.

Figure 2 is a fragmentary vertical longitudinal sectional view through the machine, showing parts thereof broken away to disclose certain details.

Figure 3 is a sectional view on the line 3—3 of Figure 2 looking in the direction of the arrow.

Figure 4 is a perspective view showing fragmentarily a portion of one of the presser rolls or rollers.

Figure 5 is a detailed plan view of the removable retaining clamping bridge of the frame of the machine.

Similar reference characters indicate corresponding parts throughout the several views in the drawing.

Referring to the drawing in detail, particularly Figure 1 thereof, A designates a portion of a table or other like support, upon which is adapted to be mounted the meat tenderer or machine, constituting the present invention. This machine comprises a base 10, of the required shape and size applicable to the standard of such machine, in this instance it being made from wood, although the same may be made from any other suitable material and has rising therefrom stationary and swinging supports, standards or uprights 11 and 12, respectively. These supports 11 and 12 are positioned the proper distance apart and said support or upright 11 being fastened at its lower end securely to the base 10 in any suitable manner, to render it immovable and rigid thereon, while the support or upright 12 is swingingly connected with the base 10 through the medium of a leaf hinge 13 connected respectively to the lower end of said support or upright 12 and to the upper face of the base as will be apparent in Figures 1, 2 and 3 of the drawing.

Carried in the swinging support or upright 12 are upper and lower parallel horizontally arranged rotatable stud journals 14 and 15, respectively, these being fitted with meshing gears 16, companions to each other and located outside of the support or upright 12, to drive the said stud journals 14 and 15 in reverse directions to each other when motion is imparted thereto.

Removably arranged between the supports or uprights 11 and 12 in parallel relation are upper and lower longitudinally fluted or corrugated presser rolls or rollers 17 and 18, respectively, each preferably made from steel, although the same can be made from any other suitable hard material and these constitute the meat tendering units of the machine. The upper roll or roller 17 is fixed to an axle or spindle 19 and likewise the lower roll or roller 18 is fixed to an axle or spindle 20, both axles or spindles at the ends of the rolls or rollers 17 and 18 next to the said stud journals 14 and 15 being extended beyond said rolls or rollers and are outwardly tapered and flat-sided to form coupling terminals 21 for removable engagement in companion sockets 22 formed in the inner ends of said stud journals 14 and 15, respectively. The axles or spindles 19 and 20 are rotatably and removably journaled in the support or upright 11 beyond the other ends of the rolls or rollers 17 and 18 which are next to said support or upright 11, the spindle or axle 20 being extended for a distance outside of said support or upright 11 and has removably fixed thereto an operating handle 23 so that on the turning of the latter moton can be transmitted directly to the roll or roller 18, thence through the gears 16 and to the roll or roller 17 and in this manner the machine operated, so that when meat is passed between the rolls or rollers 17 and 18 the spaced ribs 24 formed by the corrugated or fluted surfacing of said rolls or rollers 17 and 18 will break the sinews and fibers of the body of the meat for the tendering of the same.

The journal 14 and likewise the spindle 19 are held within a central or upwardly opening recess or furcation 25 formed in each of the supports or uprights 11 and 12 and within these recesses or furcations are arranged suitable follower blocks or bearings 26 which play against said journal 14 and spindle 19, respectively, to hold the roll or roller 17 relatively fixed with respect to the roll or roller 18. Spanning the furcations or recesses 25 in the supports or uprights 11 and 12 are bridge pieces 27 in which are threaded winged headed set screws 28 designed to work against the blocks or bearings 26 to limit the upward movements thereof in the furcations or recesses 25 in the supports or uprights 11 and 12 to hold the upper roll or roller 17 in relative position to the lower roll or roller 18 as will be clearly apparent. The screws 28 can be manually adjusted to regulate the relation of the rolls or rollers 17 and 18 with respect to each other for accommodating therebetween pieces of meat of different thicknesses when the said piece of meat is fed between the rolls for action thereof for the tendering of the said meat.

Mounted on the support or upright 12 is a removable housing 29 which conceals and encloses the journals 14 and 15 and the gears 16 thereon.

Removably engaged over the winged head 30 of the adjusting screws 28 is a retaining clamp in the form of a bar 31 having near each end an elongated slot 32 for removably engaging over the head 30 of said screws 28 and this bar at opposite ends has downturned lips or tongues 33 to overhang the outside faces of the supports or uprights 11 and 12 and in such engagement will prevent the accidental outward swinging of the support or upright 12 relative to the stationary support or upright 11 of the machine.

When it is desired to clean the rolls or rollers 17 and 18 and the complete removal thereof from the machine, it is only necessary to detach the bar 31, whereupon the support or upright 12 is free to be swung from its full line position in Figure 1 of the drawing to dotted line position shown therein. On the swinging of said support or upright 12 outwardly and downwardly, the journals 14 and 15 will become detached from the terminals 21 of the spindles 19 and 20 of the rolls or rollers 17 and 18, and the latter can be readily detached and removed from the machine by slipping the spindles 19 and 20 from engagement in the support or upright 11, when the handle 23 has been removed from the spindle 20. On removal and detachment of the rolls or rollers 17 and 18, the same can be thoroughly cleaned and in this manner render the machine before and after use thoroughly sanitary.

The base 10 of the machine is detachably secured to the support A by a conventional clamp 34 as shown in Figure 1 of the drawing, the clamp being no part of the present invention.

From the foregoing it is thought that the construction and manner of operation and advantages of the machine will be clearly apparent, therefore a more extended explanation has been omitted.

What is claimed is:—

1. A machine for the purpose set forth comprising a base, a standard fixed thereto, a movable standard arranged thereover and spaced from the other standard, means for swingingly connecting the movable standard at its lower end to the base, superposed journals carried by the movable standard and provided with sockets, corrugated rollers arranged between the standards and including spindles removably mounted in said journals and in the fixed standard whereby on the swinging of the movable standard said rollers can be completely detached, means for maintaining said movable standard in an upright position, and gears connected with said journals for operating the rollers in reversed directions to each other.

2. A machine for the purpose set forth comprising a base, a standard fixed thereto, a movable standard arranged thereover and spaced from the other standard, means for swingingly connecting the movable standard at its lower end to the base, superposed journals carried by the movable standard and provided with sockets, corrugated rollers arranged between the standards and including spindles removably mounted in said journals and in the fixed standard whereby on the swinging of the movable standard said rollers can be completely detached, means for maintaining said movable standard in an upright position, gears connected with said journals for operating the rollers in reversed directions to each other, and a housing connected to the movable standard for concealing said gears.

In testimony whereof, I affix my signature hereto.

WILLIAM WALTER MYERS.